(12) United States Patent
Hubble et al.

(10) Patent No.: US 11,822,144 B2
(45) Date of Patent: Nov. 21, 2023

(54) ACTUATOR FOR POSITIONING OPTICAL FILTERS

(71) Applicants: David O. Hubble, King George, VA (US); Evan Manley Bates, Fredericksburg, VA (US); Peter L. Wick, Jr., Fredericksburg, VA (US)

(72) Inventors: David O. Hubble, King George, VA (US); Evan Manley Bates, Fredericksburg, VA (US); Peter L. Wick, Jr., Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 44 days.

(21) Appl. No.: 17/524,886

(22) Filed: Nov. 12, 2021

(65) Prior Publication Data
US 2023/0152550 A1    May 18, 2023

(51) Int. Cl.
*G02B 7/00*    (2021.01)
*G03B 11/00*   (2021.01)

(52) U.S. Cl.
CPC .............. *G02B 7/006* (2013.01); *G03B 11/00* (2013.01)

(58) Field of Classification Search
CPC ..... G02B 26/007; G02B 26/008; G02B 26/02
See application file for complete search history.

(56) References Cited

U.S. PATENT DOCUMENTS

| | | | | | |
|---|---|---|---|---|---|
| 1,818,718 | A | * | 8/1931 | Kliegl | A63J 15/00 362/284 |
| 2,950,382 | A | * | 8/1960 | Hatch | F21V 11/18 362/281 |
| 3,255,666 | A | * | 6/1966 | Davis | G02B 7/006 359/889 |
| 3,411,847 | A | * | 11/1968 | Barbieri | G03B 27/547 355/36 |
| 4,618,918 | A | * | 10/1986 | Zhabokrug | F21V 9/40 362/281 |

* cited by examiner

*Primary Examiner* — Robert E. Tallman
(74) *Attorney, Agent, or Firm* — Gerhand W. Thielman

(57) ABSTRACT

An actuator mechanism is provided for disposing a plurality of filters into and out of a camera line-of-sight. The mechanism includes a base, a pair of frames, an axial shaft, a plurality of filter housings and a plurality of pivotable drivers. The base includes an auxiliary platform. The frames flank the base, and the shaft is disposed between the frames. Each filter housing holds a corresponding optical filter and is disposable in a deployment position in the line-of-sight and a withdrawn position out of the line-of-sight. The drivers are disposed on the platform. Each driver corresponds to an associated housing and is rotatable along the shaft to swing at least one housing between deployment and withdrawn positions upon command.

4 Claims, 8 Drawing Sheets

ACTUATOR FOR POSITIONING OPTICAL FILTERS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to actuators. In particular, the invention relates to mechanical devices for remote interchanging of optical filters, especially for camera recording of laser tests.

Imaging the engagement of a laser beam on a target is a diagnostic technique used to assess system performance and specifications. This imaging can be difficult due to the high irradiance levels delivered to the target by modern High Energy Laser (HEL) systems. Absorbing neutral density (ND) filters are required in order to attenuate the light intensity to a level that will not saturate the camera's sensor. These ND filters are typically threaded in to the camera lens and must be manually installed or removed based on the anticipated light level.

This process can be burdensome for a camera located where it is difficult for personnel to gain access. Additionally, optimizing lens settings, such as focus and field-of-view, for imaging a target is challenging with installed ND filters. Therefore, by utilizing a remotely actuated filter system, the camera can be positioned and optimized relative to the target prior to installing the filters and then the appropriate filter can be installed without disturbing the cameras position or settings. Particular filters can be switched on and off remotely by the operator as the laser engagement scenarios change to match test conditions.

SUMMARY

Conventional optical filter positioners yield disadvantages addressed by various exemplary embodiments of the present invention. In particular, various exemplary embodiments provide an actuator mechanism for disposing a plurality of filters into and out of a camera line-of-sight. The mechanism includes a base, a pair of frames, an axial shaft, a plurality of filter housings and a plurality of pivotable drivers. The base includes an auxiliary platform. The frames flank the base, and the shaft is disposed between the frames. Each filter housing holds a corresponding optical filter and is disposable in a deployment position in the line-of-sight and a withdrawn position out of the line-of-sight. The drivers are disposed on the platform. Each driver corresponds to an associated housing and is rotatable along the shaft to swing at least one housing between deployment and withdrawn positions upon command.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (in), mass in pounds-mass ($lb_m$), time in seconds (s), and torque in inch-pounds-force ($in\text{-}lb_f$).

Figure 1:
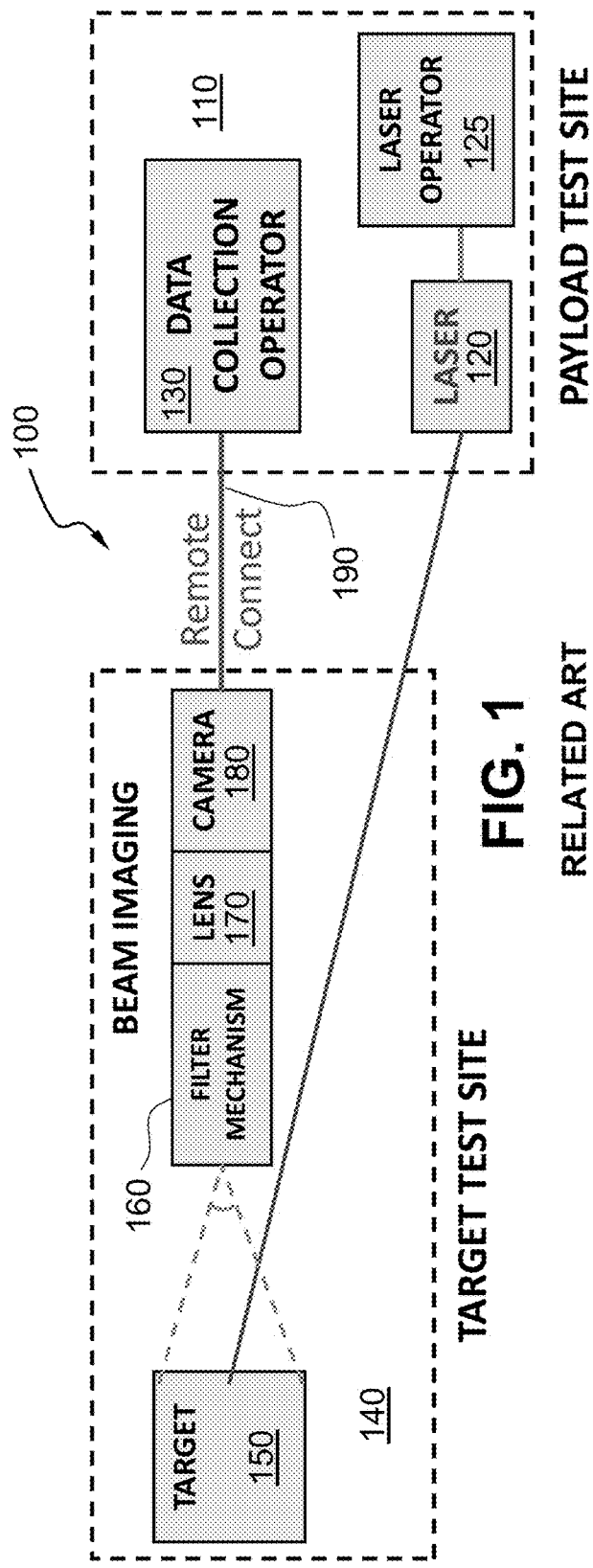
FIG. 1 is a diagram view of a conventional test setup.

FIG. 1 shows a diagram view 100 of a conventional laser test setup. A blockhouse 110 with laser 120, laser operator 125, data collection operator 130. Laser 120 directed towards target test site 140 with a target 150. Reflections therefrom are received through a filter mechanism 160 into a lens 170 and recorded by a camera 180 remotely controlled electronic linkage 190 via the data control operator 130.

Figure 2:
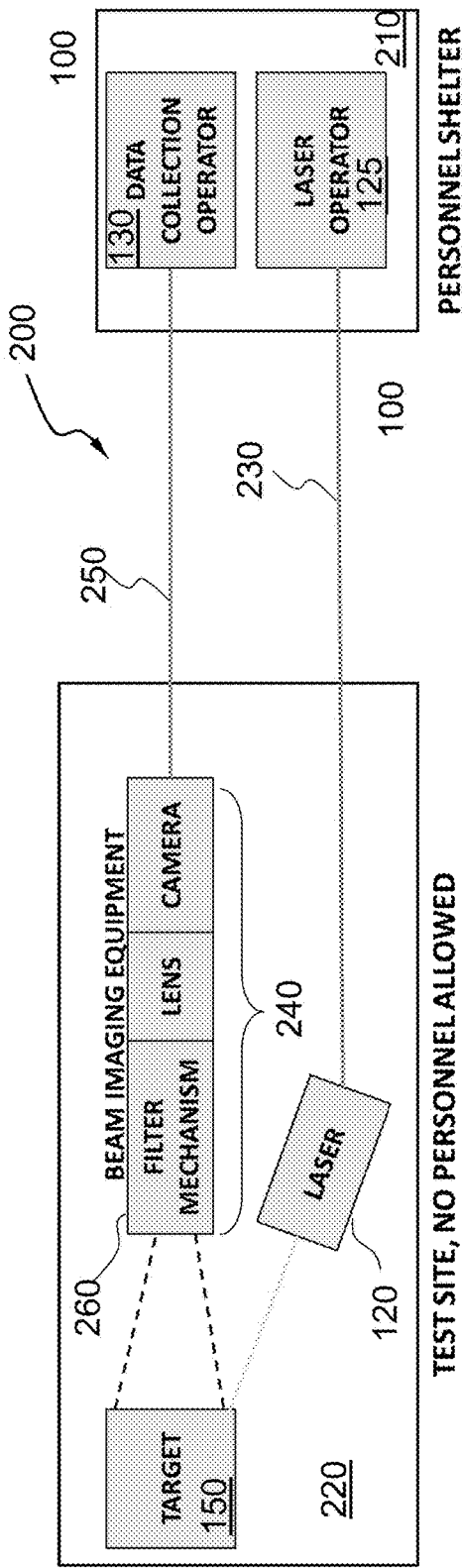
FIG. 2 is a diagram view of an exemplary test setup.

FIG. 2 shows a diagram view 200 of an exemplary laser test setup. The blockhouse 210 maintains the laser operator 125 and the data collection operator 130, while the laser 120 is disposed at an exemplary test site 220 to illuminate the target 150. Beam imaging equipment 240 controlled via linkage 250 via the data collection operator 130 includes an exemplary filter actuation mechanism 260 receives reflections from the target 150 transmitted through the lens 170 and into the camera 180.

Figure 3:
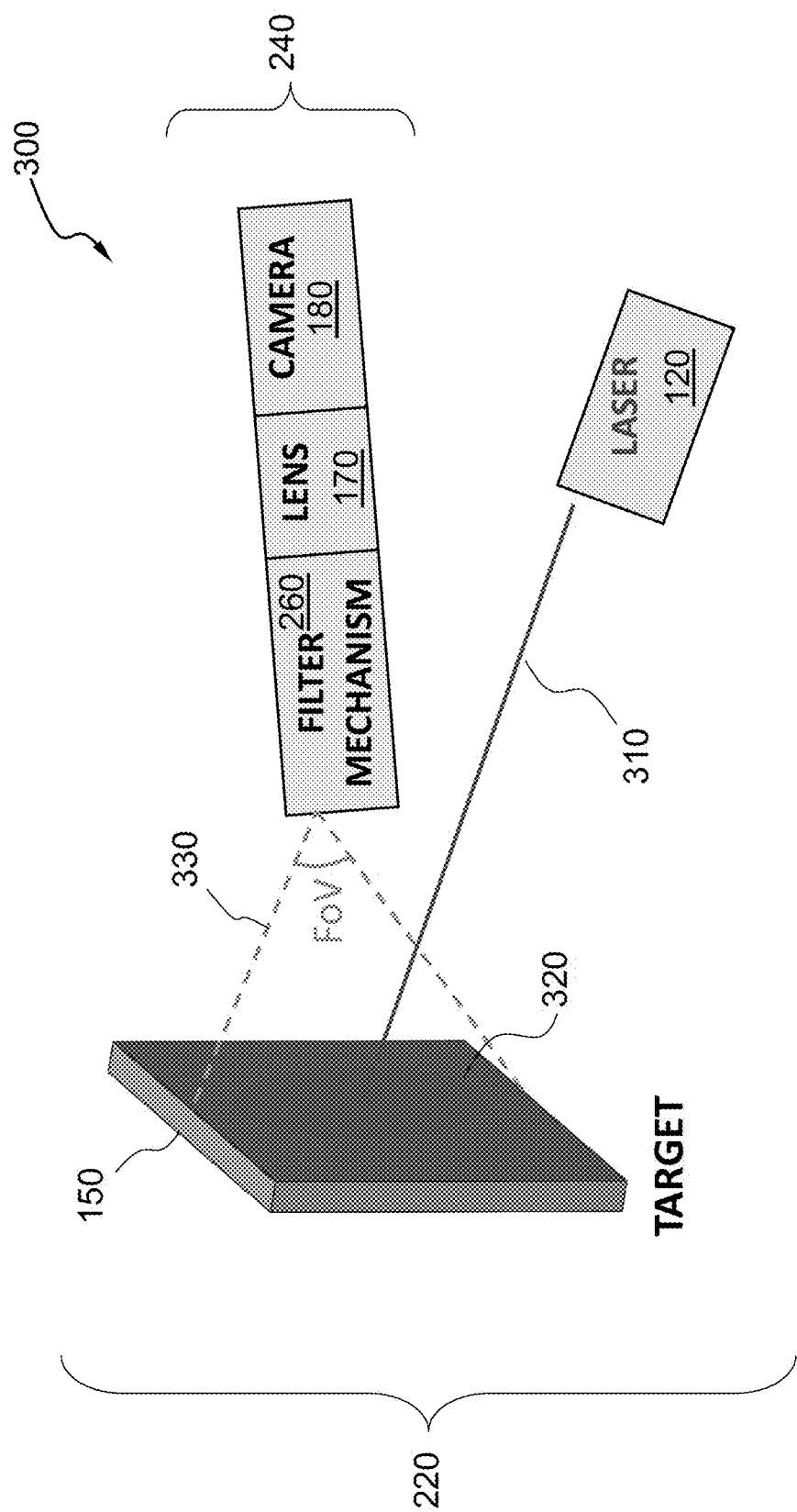
FIG. 3 is a diagram view of an exemplary test site.

FIG. 3 shows a diagram view 300 of the test site 220. The laser 120 emits a coherent electromagnetic light beam 310 to illuminate the target 150, which reflects some of the incident energy and thereby producing a reflection area 320. The filter mechanism 260 as one module of the beam imaging equipment 240 has a field-of-view 330 from which to receive reflected electromagnetic energy, which is then transmitted through the lens 170 and recorded by the camera 180.

Figure 4:
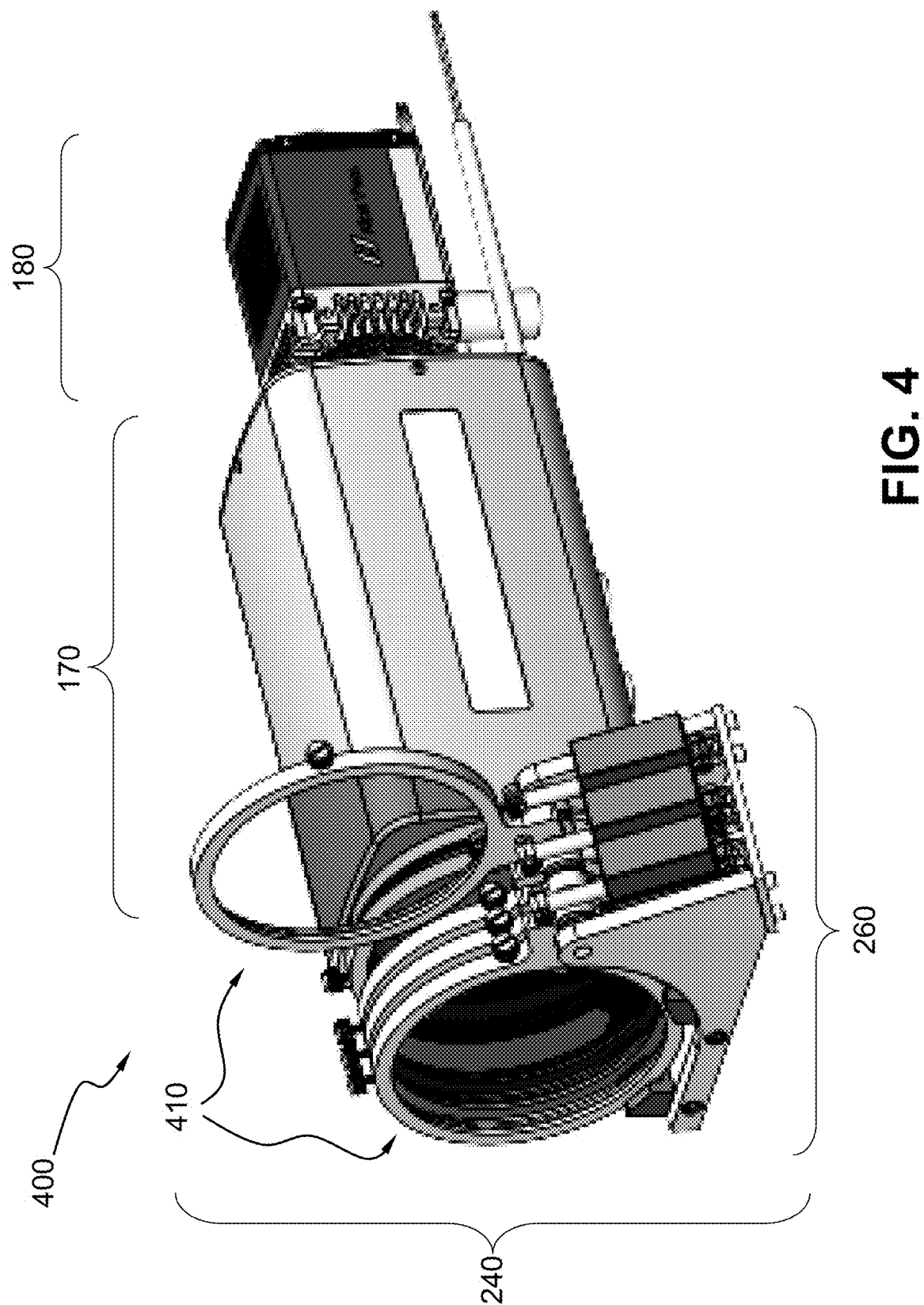
FIG. 4 is an isometric assembly view of an imaging equipment assembly.

FIG. 4 shows an isometric assembly view 400 of the beam imaging equipment 240, illustrated as modules, rather than as generic boxes. The filter actuation mechanism 260 includes a series of movable filter actuator assemblies 410, so the quantity of reflected electromagnetic energy into the camera 180 can be adjusted by selecting the number of filter assemblies 410 to interpose between the reflection area 320 and the lens 170.

Figure 5:
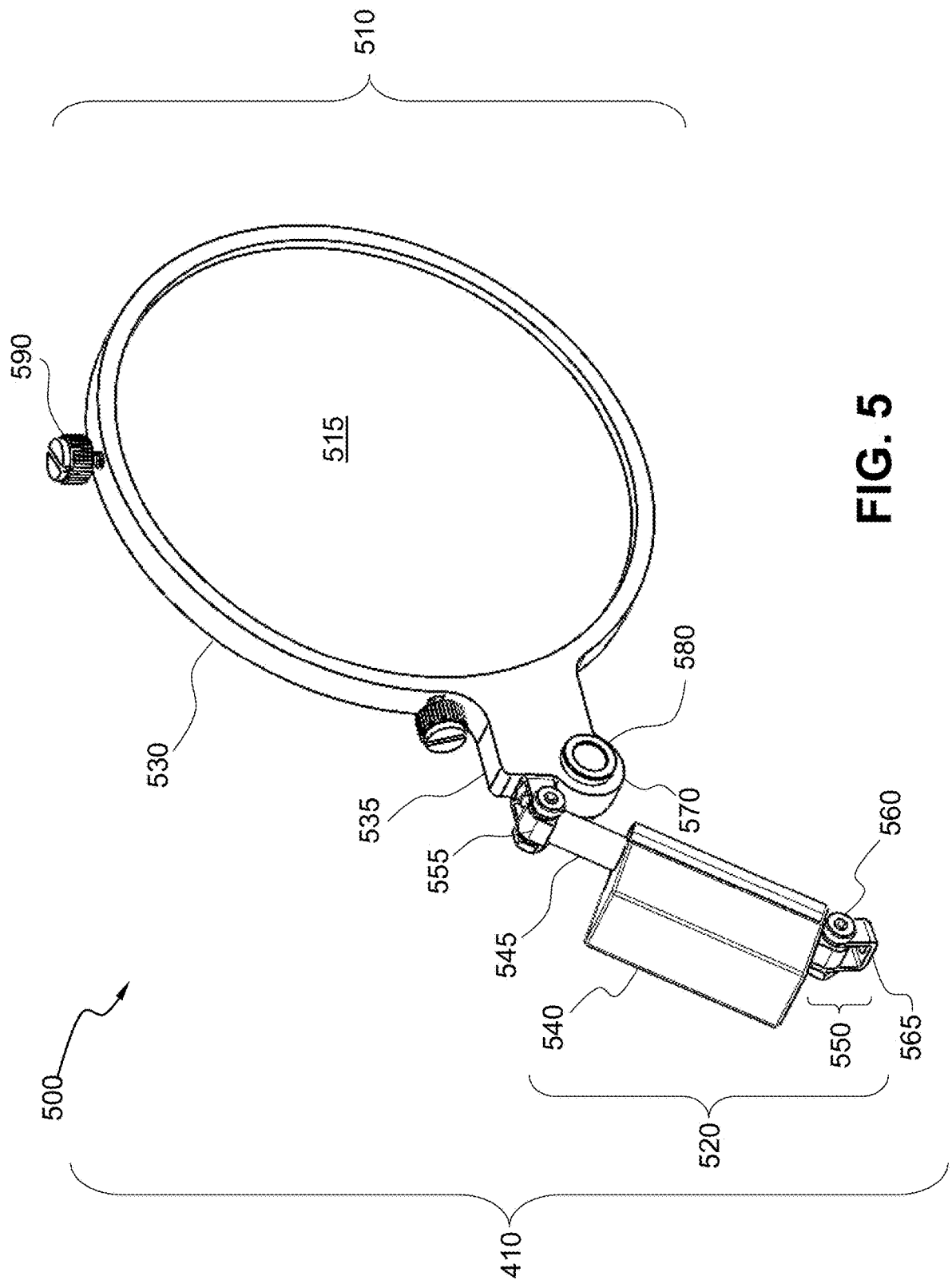
FIG. 5 is an isometric exploded view of a filter actuator assembly.

FIG. 5 shows an isometric exploded view 500 of the filter actuator assembly 410 comprising a filter module 510 to contain an optical filter disk 515 and an actuator module 520. The filter module 510 includes a housing ring 530 to contain the ND filter disk 515 along with a swing armature 535. The actuator module 520 includes a linear actuator or driver 540 with a ribbon 545 and terminating in pin joint 550. Each pivotable joint 550 includes a hinge 555, a nut-and-bolt fastener 560 and a bracket 565.

The swing armature 535 includes a sleeve 570 into which a bronze bushing 580 inserts therein to reduce friction. The housing ring 530 can secure the filter 515 by tightening peripheral locking screws 590. The driver 540 unwinds or retracts the ribbon 545 to lengthen or shorten the distance between opposite pivotable joints 550. The driver 540 is preferably a miniature electric linear actuator, for example, an Actuonix PQ12-001-6-R.

Figure 6:
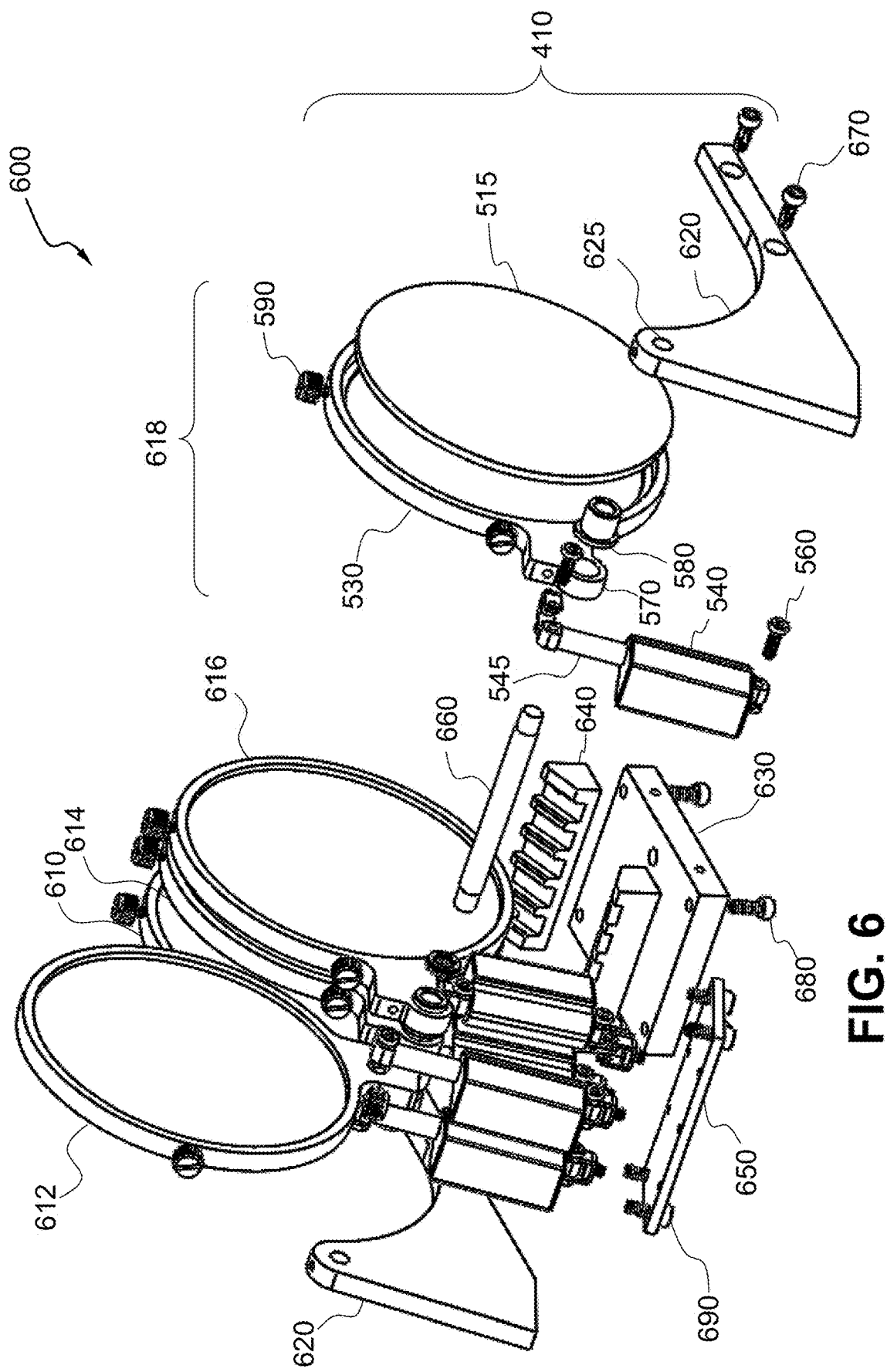
FIG. 6 is an isometric exploded view of a filter mechanism.

FIG. 6 shows an isometric exploded view 600 of filter actuation mechanism 260. In the example view 600, five filter assemblies 410 are featured. These include a distal unit 610, a withdrawn unit 612, an intermediary unit 614, an adjacent unit 616 and a proximal unit 618 shown disassembled. The units 610, 614, 616 and 618 are shown in deployment position aligned with the camera 180. Any filter module 510 and its associated actuator module 520 are presented herein as the filter actuator assembly 410.

The filter actuator assemblies 410 separately identified as units 610, 612, 614, 616 and 618 are contained between flanking aluminum frames 620, each with a hole 625 and mounted to a base 630 that supports tangent spacer blocks 640 to separate the drivers 540. A plate 650 provide a mount onto which the actuator modules 520 attach. A shaft rod 660 inserts into the holes 625 while also passing through the bushing 580 in the sleeve 570 of each ring 530. Screws 670 secure the frames 620 to the base 630. Screws 680 secure the blocks 640 and the base 630. Screws 690 secure the plate 650 to the frames 620 for anchoring the driver 540 to the plate 650. The rings 530, filter disks 515, drivers 540 and ribbons 545 are uniform in size. Opacity distinctions in filter disks 515 are independent of exemplary embodiments.

Each filter module 510 includes the optical filter disk 515 encased in the ring 530 secured by the locking screws 590. By the driver 545 expanding and contracting the ribbon 545, the armature 535 turns on the rod 660, operating as a swing arm attached to the plate 650 and to the ring's sleeve 570 by pivotable joints 550.

Figure 7:
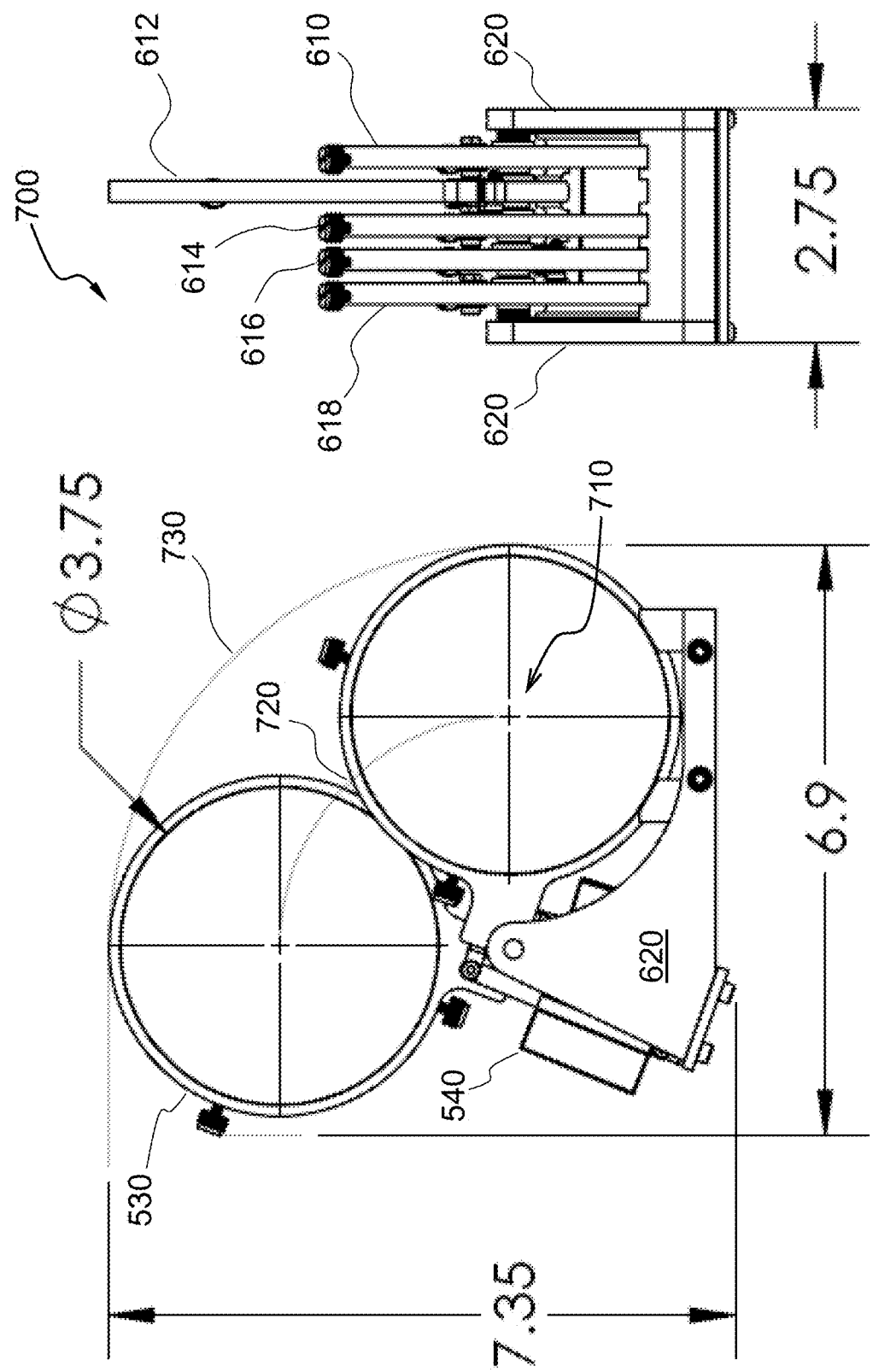
FIG. 7 is an elevation assembly view of the filter mechanism.

FIG. 7 shows an isometric assembly view 700 of the filter actuator mechanism 260 with exemplary scales. With select filter actuator assemblies 410 engaged and withdrawn, the mechanism 260 extends 6.9 inches in length, 2.75 inches in width and 7.35 inches in height. The filter disks 515 have an outer diameter of 3.75 inches with a center 710 that the driver 540 rotates along an arc 720. The ring 530 connected via the rod 660 follows, rotating along an arc 730 about the axis of the rod 660. Total mass of the actuator mechanism 260 is about 1.0 $lb_m$. Torque of the drivers 540 is about 2.5 in-$lb_f$. These dimensions are exemplary and not limiting.

Figure 8A:
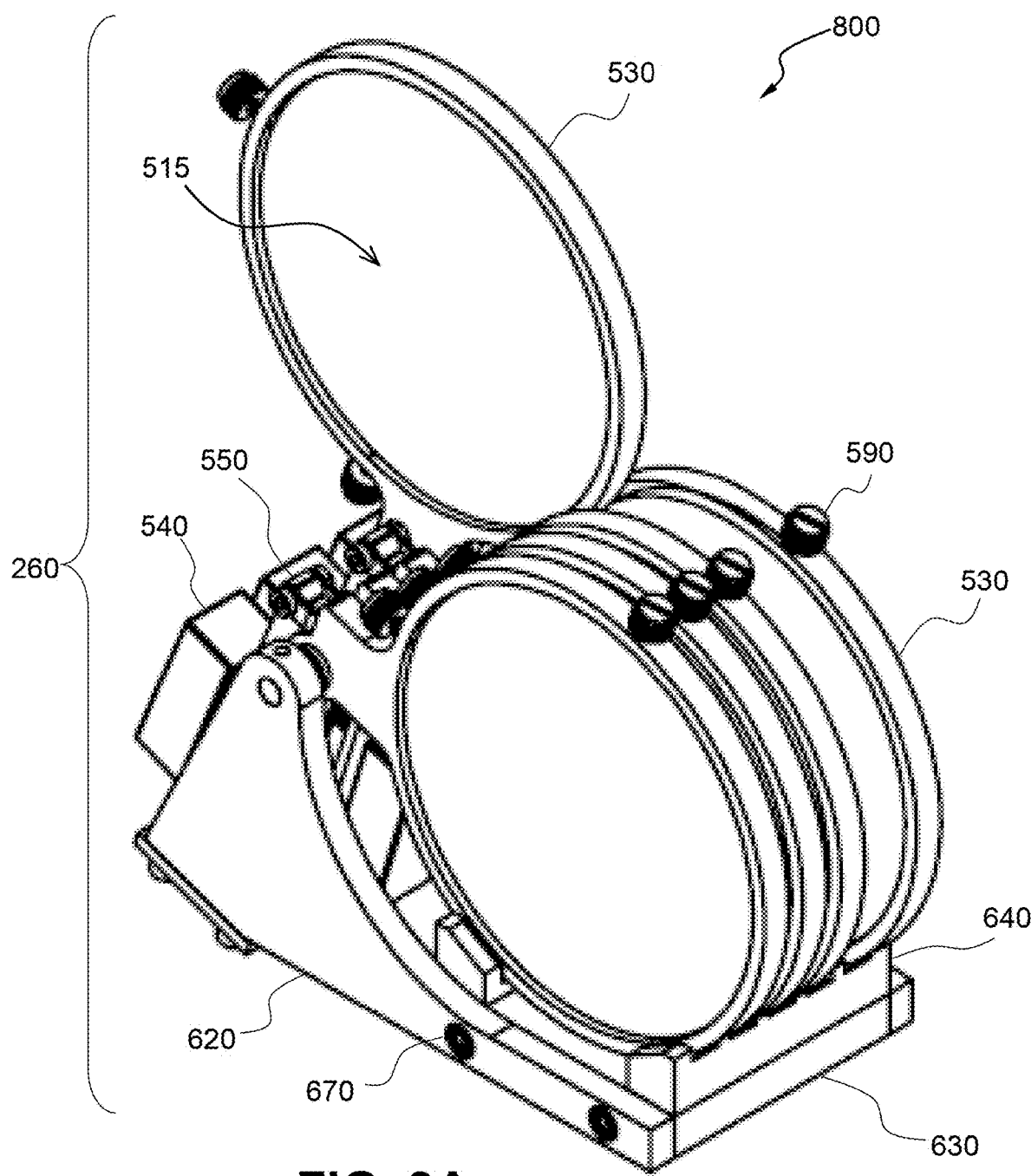
FIGS. 8A and 8B are isometric assembly views of the filter mechanism.
Figure 8B:
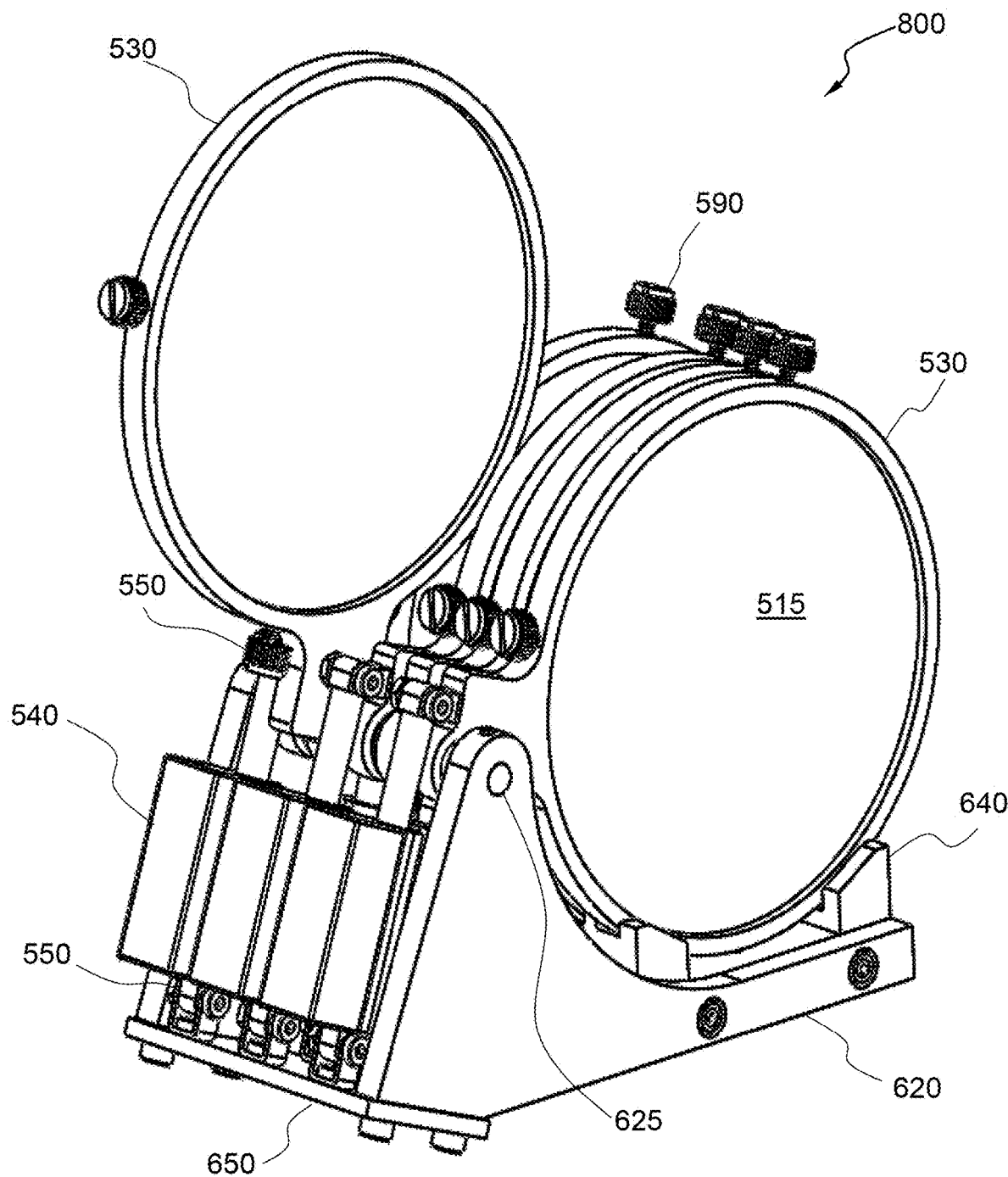

FIGS. 8A and 8B show isometric assembly views 800 of the filter actuator mechanism 260, in which withdrawn unit 512 is elevated out from the laser optical line-of-sight. The assembly shows the actuator module 520 connecting to the rings 530 by fasteners 560 and to the plate 670 by fasteners 550. The rod 660 passes through sleeves 570 and their bushings 580 and terminate at the holes 625 of the frames 620.

The filter modules 510 are swung into or out of alignment with the camera 180 by miniature electric drivers 540 controlled remotely using an onboard microcontroller that communicates with a control computer via the operator 130 in the blockhouse 210. Alignment of the filter disks 515 with the camera 180 is ensured when in the lowered position by the pair of tangent spacer blocks 640.

The rings 630 with their armatures 535 are fabricated as a single unit from 6061 aluminum and contain an oil impregnated bronze bushing 580 in the sleeve 570 to ensure smooth operation. The filter modules 510 are swung into or out of alignment with the camera 180 by their corresponding drivers 540, which are controlled remotely using an onboard microcontroller via the operator 130 in the blockhouse 210. Alignment of the filter disks 515 with the camera 180 is ensured when in the lowered position by the two tangent spacer blocks 640.

The exemplary filter mechanism 260 operates in open-air HEL Test and Evaluation (T&E) events. The camera 180, lens 170, and filter mechanism 260 are disposed near the target 150 being engaged by the laser 120 at the test site 220, which can be an isolated location in which personnel are prohibited. The operator 130 is at a separate blockhouse 210 for safety reasons. The remotely actuated filter mechanism 260 enables the optical filters 515 to be switched without personnel having to travel downrange to the target test site 220.

The ability to remotely change and stack filters on the exemplary mechanism 260 is an advantage when the camera 180 and the operator 130 cannot be co-located. This enables settings for the camera 180 and lens 170 to be optimized for each situation as, for instance, reflectivity of the target 150 or the laser power change. Additionally, initial setup can be accomplished with no filters actuator assemblies 410 installed, which enables a clear view of the target 150 with the camera 180. Once settings are adjusted and the position aligned, the appropriate filter actuator assemblies 410 can be remotely deployed without affecting the position of the equipment 240.

As a conventional alternative, filter disks 515 can be manually threaded into camera lenses 170. Remotely operated filter wheels exist but these require a much larger volume for a given aperture size. These are typically limited to apertures of 50 mm or less.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An actuator mechanism for disposing a plurality of filters into and out of a camera line-of-sight, said mechanism comprising:
   a base;
   a pair of frames flanking said base;
   a plate disposed between said frames and adjacent to said base;
   an axial shaft disposed between said frames;
   a plurality of filter armatures, each armature holding a corresponding optical filter, each housing having a hinge for disposal in a deployment position in the line-of-sight and a withdrawn position out of the line-of-sight; and
   a plurality of pivotable drivers disposed on said plate, each driver corresponding to said each armature for translating respective said hinge for pivoting along said shaft to swing at least one armature between said deployment and withdrawn positions upon command.

2. The mechanism according to claim 1, wherein same frames, said armatures and said base are substantially composed of aluminum.

3. The mechanism according to claim 1, wherein said base includes a block to separate said armatures in said deployment position.

4. The mechanism according to claim 1, wherein said each driver is a miniature electric linear actuator.

* * * * *